United States Patent [19]
Reeme et al.

[11] Patent Number: 5,347,849
[45] Date of Patent: Sep. 20, 1994

[54] WATER SENSOR THAT DETECTS TANK OR VESSEL LEAKAGE

[75] Inventors: Mahan L. Reeme, Houston; Barry N. Williams, Rosharon; Glenn A. Kauffman, Pasadena, all of Tex.

[73] Assignee: Tanknology Corporation International, Houston, Tex.

[21] Appl. No.: 918,559

[22] Filed: Jul. 22, 1992

Related U.S. Application Data

[63] Continuation-in-part of Ser. No. 575,089, Aug. 30, 1990, Pat. No. 5,156,047.

[51] Int. Cl.$^5$ .................. G01F 23/30; G01F 23/64; G01M 3/32
[52] U.S. Cl. ........................... 73/49.2; 73/319; 73/290 V; 73/DIG. 5; 73/DIG. 2; 73/313
[58] Field of Search ........... 73/319, 313, 314, DIG. 2, 73/DIG. 5, 40, 49.2

[56] References Cited

U.S. PATENT DOCUMENTS

| | | |
|---|---|---|
| 2,836,739 | 5/1958 | Mesh . |
| 2,938,283 | 5/1960 | Blackburn . |
| 3,062,994 | 11/1962 | Mesh . |
| 3,253,280 | 5/1966 | Feyling . |
| 3,898,555 | 8/1975 | Tellerman . |
| 3,952,593 | 4/1976 | Ells . |
| 3,964,311 | 6/1976 | Holmen . |
| 4,056,978 | 11/1977 | Zimmerman . |
| 4,258,422 | 3/1981 | Dougherty et al. ............ 73/304 C |
| 4,296,630 | 10/1981 | Jung et al. . |
| 4,349,882 | 9/1982 | Asmundsson et al. . |
| 4,382,382 | 5/1983 | Wang . |
| 4,434,657 | 3/1984 | Matsumura et al. . |
| 4,462,249 | 7/1984 | Adams . |
| 4,506,540 | 3/1985 | Marsh . |
| 4,555,941 | 12/1985 | Fathauer et al. . |
| 4,589,077 | 5/1986 | Pope . |
| 4,590,575 | 5/1986 | Emplit . |

(List continued on next page.)

FOREIGN PATENT DOCUMENTS

| | | |
|---|---|---|
| 69023 | 5/1980 | Japan . |
| 170739 | 9/1984 | Japan . |
| 1049882 | 11/1966 | United Kingdom . |
| 2159954 | 12/1985 | United Kingdom . |

OTHER PUBLICATIONS

The Journal of Petroleum Marketing, Technology Update, "Leak Detection A recently approved method meets compliance and saves money", Falice Mikelberg, pp. 12, 14, 16–18, Oct. 1991.

(List continued on next page.)

*Primary Examiner*—Diego F. F. Gutierrez
*Attorney, Agent, or Firm*—Vaden, Eickenroht, Thompson, Boulware & Feather

[57] ABSTRACT

The apparatus of the invention is a water level probe comprised of a probe body, a sleeve having openings permitting fluid flow and encasing part of a magnetostrictive sensor, and an external housing encasing electronic circuitry for processing and transmitting the electric signal generated by the magnetostrictive sensor and sealing the circuitry from fluids. The sensor comprises a float slidably mounted on a rod, the float designed to float in water but sink in a petroleum product, thereby ensuring that it will float at the interface between the water and the product. The water level probe is used in the method of the invention to measure the depth of the water in a vessel storing hydrocarbon product at predetermined time intervals. The longitudinal angle of inclination of the vessel with respect of the horizon having previously been determined, the volume of water in the vessel is calculated from the depth measurements. The rate of hydrocarbon leakage is then determined from the calculated volumes to ascertain the rate of change of water volume over time.

2 Claims, 3 Drawing Sheets

U.S. PATENT DOCUMENTS

| | | |
|---|---|---|
| 4,706,203 | 11/1987 | Ramsdale et al. . |
| 4,736,622 | 4/1988 | Miller et al. . |
| 4,813,284 | 3/1989 | Miller et al. . |
| 4,813,285 | 3/1989 | Brown et al. . |
| 4,819,483 | 4/1989 | Emplit et al. . |
| 4,839,590 | 6/1989 | Koski et al. ............................ 73/314 |
| 4,864,857 | 9/1989 | Koon . |
| 4,890,492 | 1/1990 | Andrejasich et al. . |
| 4,910,998 | 3/1990 | Willis et al. . |
| 4,935,727 | 6/1990 | ReFiorentin et al. ............ 73/304 R |
| 4,977,528 | 12/1990 | Norris . |
| 5,017,867 | 5/1991 | Dumais et al. ........................ 73/314 |
| 5,084,679 | 1/1992 | Lofgren . |
| 5,124,933 | 6/1992 | Maier ............................... 73/290 R |
| 5,136,884 | 8/1992 | Lovett ................................... 73/319 |

OTHER PUBLICATIONS

Printout from a computerized database of information pertaining to Soviet Union Patent No. 523,285 issued Jul. 30, 1976. The information includes an abstract as well as application and classification data (Only abtract considered).

Abstract and application information for Japanese Patent No. 55-69023, May 24, 1980 (only abstract considered).

Product Data, Image II ™, "Inventory Management and Leak Detection System", Engineered Systems, Inc. ™, two pages (1991).

*Sensors,* pp. 20 and 21 (Jun. 1991), "Magnetostrictive, Ultrasonic Transducer Measures Displacement and Velocity".

Norstat, Inc., Product Brochure, Magnetostrictive Displacement Transducer, Montville, N.J., 5 pages, unknown date.

Intelligent Controls, Inc. Product Brochure, Model 1898 Series Liquid Level Sensor, 2 pages, (suspected date of Mar. 1989).

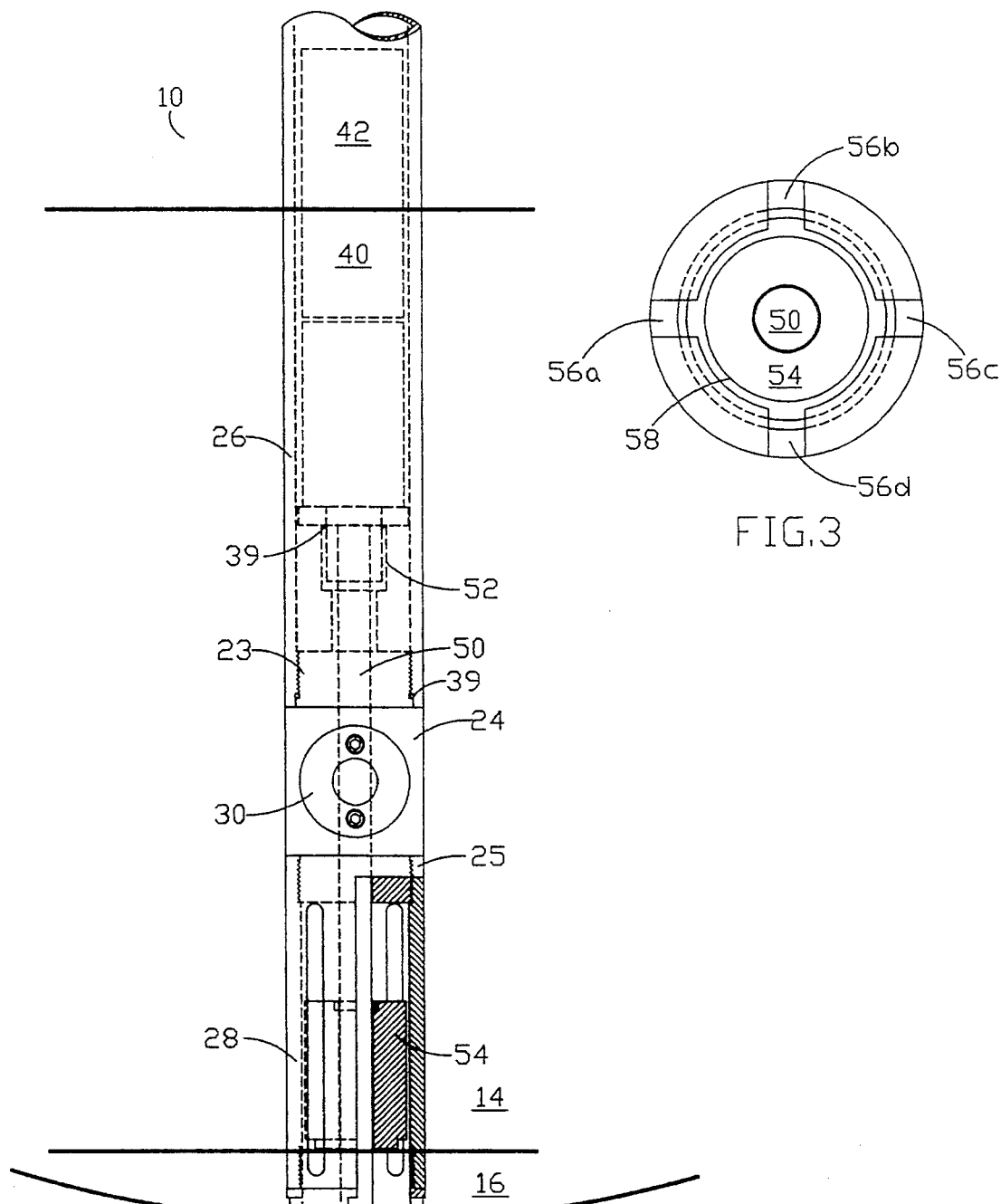

WATER SENSOR THAT DETECTS TANK OR VESSEL LEAKAGE

BACKGROUND OF THE INVENTION

This application is a continuation-in-part of co-pending application Ser. No. 07/575,089, filed Aug. 30, 1990, now U.S. Pat. No. 5,156,047.

FIELD OF THE INVENTION

This invention pertains generally to a method and apparatus for detecting a leak in a container by measuring the level of an electrically conductive fluid contained therein. More specifically, it relates to detecting a leak in an underground petrochemical storage tank by measuring the level of the water in the tank.

DESCRIPTION OF THE PRIOR ART

For many years there have been concerted efforts in the petrochemical industry to prevent environmental contamination resulting from leaks in underground storage vessels. Underground storage tanks are not only found in refineries and other large facilities, but also in gasoline service stations. Such locations may have as many as three or four such tanks and consequently there are a large number of these tanks dispersed over an incredibly large area.

The governments of the United States and other countries have for some time issued and enforced regulations requiring the detection and correction of leaks in an effort to prevent environmental damage, particularly contamination of underground water supplies. A sizable industry has developed to provide the technology and skills needed to enable service station owners and others to comply with these federal regulations. Compliance typically involves transporting manpower and materials to the site of the tank and performing a series of tests designed to measure certain conditions inside the tank on a regular basis. These conditions yield indications of whether a leak exists and, preferably, the size of the leak. In the United States, the federal government now also regulates and certifies the instruments used in these tests.

One commonly tested condition is the level of water in the tank. A leak that allows a chemical to seep from a tank into the environment also allows water to seep into the tank. Because water is immiscible with many chemicals and fuels, and because water is heavier than gasoline, the two fluids separate into two layers with the water on the bottom. It is therefore possible to position a probe on the bottom of the tank to measure the level of water in the tank. By monitoring the change in the level of the water over a preselected period of time, it is possible to determine whether a leak exists and the size of the leak.

One critical limitation on most known methods of water detection is that, in the United States, federal regulations require instruments for use in testing gasoline storage tanks to detect leaks as small as 0.1 gal/hr. Further, these tanks can have extremely large dimensions. Such large dimensions sometimes result in a very thin layer of water in the tank, having a depth perhaps as small as 0.020 inches.

Because of the thin (or shallow) layer of water and the slow rate of change, a depth measuring device must therefore be capable of operating with relatively high resolution and precision. Because of the limited resolution capabilities of known methods for quantifying the influx of water and the long time required for sufficient water to leak into the tank to be able to be detected by these known devices as a result of their limited resolution, known methods may require several hours of testing time per tank. In installations in which there are several tanks, the time required to test each tank causes testing costs to approach the prohibitive level.

There have been many attempts to design a suitable probe for detecting the presence and/or level of water in a tank, but the disadvantage of most known probes is their length. These probes are generally cylindrical and, in addition to housing the circuitry for quantifying the influx of water into the tank, include the necessary components for sensing temperature (for correcting depth changes for changes in temperature which cause volume changes). One such probe commonly utilized by the assignee of the present invention also contains instrumentation and circuitry for detecting the bubbles created in the fluid by an influx of air.

The latter function results from a leak test which is conducted by evacuating the ullage in the tank and detecting the bubbles formed in the fluid in the tank by the air which enters the tank below the surface of the fluid in accordance with the method described in U.S. Pat. No. 4,462,249, assigned to the owner of the present invention and hereby incorporated herein in its entirety by this specific reference thereto. As disclosed therein, a hydrophone is mounted in the probe body for detecting the resulting bubbles. Due to the length of the probe body and the fact that the hydrophone must be submerged to function properly, the tank must contain a minimum depth of fluid to insure that the hydrophone is submerged.

There are many circumstances in which that minimum depth requirement causes problems. For instance, when a testing crew arrives on site and discovers that a gasoline service station storage tank does not include that minimum depth of product, the station operator must buy more product. Additional product takes time to procure and costs extra because of the unscheduled nature of the delivery. Another alternative which is also costly is that the testing crew must return at another time.

The invention disclosed in application Ser. No. 07/575,089, filed Aug. 30, 1990, now U.S. Pat. No. 5,156,047, overcame these disadvantages by etching conductive traces on a detector board protruding from the lower end of the probe body through a sleeve, the remainder of the electronic circuitry being environmentally isolated within the probe body. The traces were etched in a pattern where they terminate at successively higher levels so that a higher or lower number of traces are submerged to provide an indication of change in water depth. The probe therefore measures water level in discreet intervals which, although that invention's performance is far superior to other probes, sometimes requires inordinately long periods of time to register a change. Even then, because depth is measured in discrete intervals, interpolation is necessary to find the leak rate measured in volume per unit time.

By way of example, if the parallel traces etched on the detector board of the probe disclosed in that co-pending application are spaced at, for instance, 0.15" intervals, and one additional trace is covered with water from an influx of water over the course of two hours of the test, it is necessary to assume that the leak rate is such that the depth of the water changes at the rate of 0.075" per hour. The actual rate could be anywhere from, for instance 0.01" to 0.29" per hour, depending upon how much of each trace is covered at the beginning of the test. Further, that depth change must be converted to volume per hour by multiplication depending upon the geometrical dimensions of the tank and, as will be developed further infra, that conversion is not always accurate and introduces an additional possible source of error into the measurement.

It is, therefore, a principal feature of the present invention to provide a method and apparatus capable of overcoming these disadvantages and limitations of prior known methods and apparatus for detecting leaks in storage tanks.

It is also a feature of this invention that it reduces the amount of time necessary to test a storage tank for leaks by detecting changes in the level of water therein relative to known methods and apparatus.

It is also a feature of this invention that such an apparatus be sufficiently small and lightweight so that it can be easily transported to different varying locations.

It is a further feature of this invention that the apparatus be compatible with existing technology in the industry.

It is still a further feature of this invention that the apparatus complies with current federal regulations regarding operation and performance of these types of instruments and that, if properly used, it will enable gasoline storage tank operators and owners to also comply with federal regulations.

SUMMARY OF THE INVENTION

The apparatus of the invention is a water level probe comprised of a probe body, a sleeve having openings permitting fluid flow and encasing part of a magnetostrictive sensor, and an external housing encasing electronic circuitry for processing and transmitting the electric signal generated by the magnetostrictive sensor and sealing the circuitry from fluids. The sensor comprises a float slidably mounted on a rod, the float designed to float in water but sink in a petroleum product, thereby ensuring that it will float at the interface between the water and the product.

The water level probe is used in the method of the invention to measure the depth of the water in a vessel storing hydrocarbon product at predetermined time intervals. The longitudinal angle of inclination of the vessel with respect of the horizon having previously been determined, the volume of water in the vessel is calculated from the depth measurements. The rate of hydrocarbon leakage is then determined from the calculated volumes to ascertain the rate of change of water volume over time.

BRIEF DESCRIPTION OF THE DRAWINGS

So that the manner in which the above recited features and advantages of the invention, as well as others that will become apparent, are attained and can be understood in detail, a more particular description of the invention briefly summarized above may be had by reference to the preferred embodiment illustrated in the drawings of this specification. Note that these drawings illustrate only a preferred embodiment of the invention and are not to be considered limiting of its scope as the invention may admit to other equally effective embodiments.

FIG. 2 is a side, quarter-sectional view of the apparatus of the invention;

FIG. 3 is an end view of the apparatus of the invention; and

DESCRIPTION OF THE PREFERRED EMBODIMENT

Figure 1:
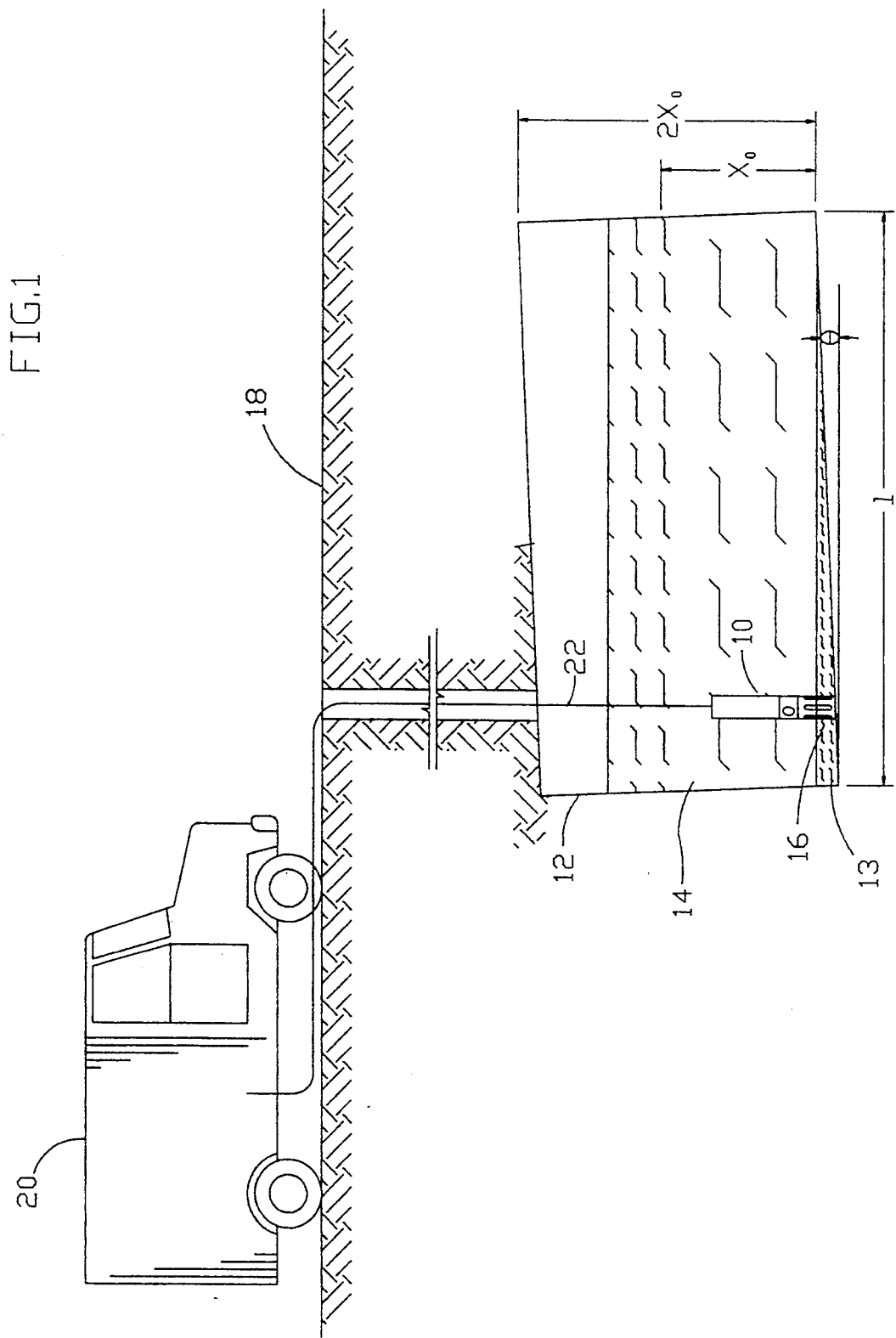
FIG. 1 generally illustrates the use of the invention in its operational environment.

FIG. 1 depicts water level probe 10 positioned on the bottom of vessel 12. Vessel 12 is partially filled with layers of a fluid such as gasoline, or other hydrocarbon product, 14 and a fluid such as water 16. Although vessel 12 is only shown partially filled, the practice of the invention is equally effective in tanks that are completely full. Gasoline 14 and water 16 are immiscible and therefore layer, the heavier fluid (water 16) layering beneath the lighter. Vessel 12 is located beneath ground surface 18 and is typically oriented at a small angle $\theta$ longitudinally with respect to the horizon, as a result of the installation of the vessel 12. A properly installed 10,000 gallon underground storage tank, for instance, has a tilt amounting to a difference in the height of one end of the tank of about four inches compared to the other end.

Probe 10 is connected to a truck 20 via cable 22 and suspended in tank or vessel 12 by that cable. Truck 20 stores and processes electronic data collected and transmitted by probe 10 to truck 20 via cable 22. The methods and electronics necessary for transmitting and processing the data can be any of several well known to those ordinarily skilled in the art.

FIG. 2 depicts a lower portion of probe 10 in greater detail and in a side, quarter-sectional view. Probe 10 generally comprises probe body 24 to which external housing 26 and protective sleeve 28 are threadably engaged at either end of probe body 24. Probe body 24, in the preferred embodiment, is typically constructed from a solid, cylindrical slug of aluminum or stainless steel in which threads are milled on both ends.

Figure 4:
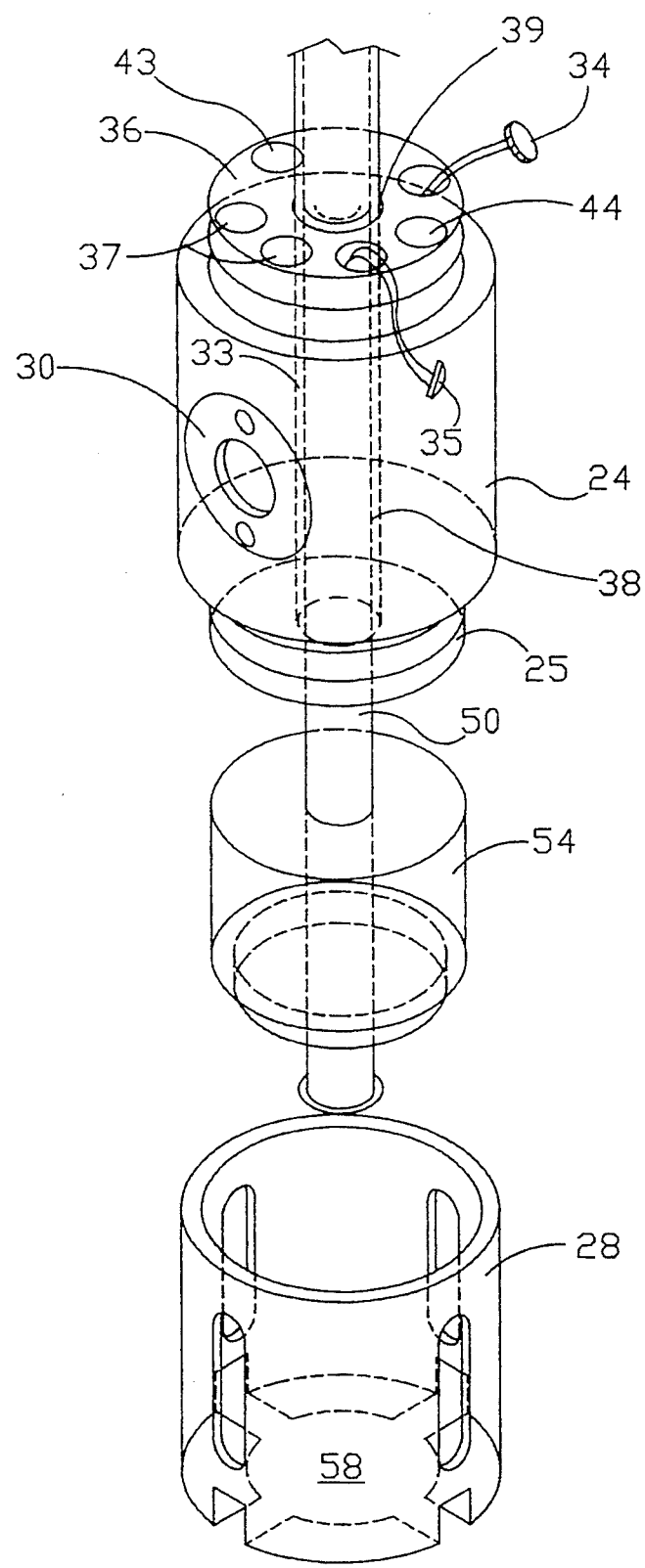
FIG. 4 is an exploded, perspective view of a lower portion of the presently preferred embodiment of the apparatus of the invention.

Now referring to FIGS. 2 and 4, the preferred embodiment of probe body 24 includes hydrophone mounting means 30 on the side thereof oriented perpendicularly to the length of probe body 24. Probe body 24 also includes, as shown in FIG. 4, a temperature sensor mounting means 37 and pressure transducer 34 located on the top 36 of probe body 24. Connector 35 mates with a connector (not shown) on the inside of external housing 26 to connect probe body 24; detector board 40, to logic board 42 and to cable 22.

Referring to both FIGS. 2 and 4, slot 38 is milled throughout the length of probe body 24 through which rod 50 of magnetostrictive sensor 52 passes. Magnetostrictive sensor 52 in the preferred embodiment is the MTS LEVEL PLUS industrial tank gauge manufactured by MTS Systems Corporation, Sensors Division, Research Triangle Park N.C. and is commercially available. Float 54 incorporating a ring magnet (not shown) is slidably mounted on rod 50 below probe body 24 and in sleeve 28, float 54 sliding in response to changes in fluid level. The construction of sleeve 28 is discussed below in connection with FIG. 3.

External housing 26 encases detector board 40 and logic board 42. Detector board 40 is electrically connected to magnetostrictive sensor 52 by an electrical connector (not shown) in any of several ways commonly known to those in the art. To some degree, as in the preferred embodiment, the manner of connection is dictated by the chosen embodiment for magnetostrictive sensor 52. Logic board 42 is similarly connected to detector board 40 via an electrical connector (not shown) in a manner well known to those in the art. Together, detector board 40 and logic board 42 receive the data from magnetostrictive sensor 52, process and condition the data, and then transmit the data to truck 20 (shown in FIG. 1) via cable 22.

FIG. 3 depicts probe 10 from the bottom end and, hence, the bottom end of sleeve 28. Protective sleeve 28 is shown mounted to probe body 24 on threads 25 in FIG. 2 and encases float 54 as it slides on rod 50 of magnetostrictive sensor 52. As shown in FIG. 4 in addition to FIG. 3, sleeve 28 also has openings 56a–d and 58 milled or cut therein to permit the fluid flow into the interior of sleeve 28.

Threaded connection 23 is a fluid seal which prevents fluid flow into probe 10 above probe body 24. Furthermore, there are two O-rings 39, one in slot 38 through which rod 50 passes and one at the interface between detector board 40 and magnetostrictive sensor 52, which also provide fluid seals. O-rings 39, in conjunction with threaded connection 23 (shown in FIG. 2), environmentally isolate those portions of probe 10 above probe body 24 from the fluid in which probe 10 operates. Thus, magnetostrictive sensor 52 operates entirely within the fluid while the electronic circuitry on detector board 40 and logic board 42 are environmentally isolated therefrom.

In operation, power is transmitted from truck 20 via cable 22 to probe 10 once probe 10 is lowered to the bottom of vessel 12 and the test starts. Referring now to FIG. 2, float 54 is especially designed to float on water 16 but submerse in gasoline 14. In addition to being immiscible, water and gasoline have different specific gravities, the specific gravity of gasoline being approximately 0.74 and of water being 1.0. Thus, float 54 must be constructed of a material having a higher specific gravity than gasoline but lower than water.

As time passes during the test, float 54 will rise and fall with the change in water level in vessel 12 if there be any. In accord with the general principle of operation for magnetostrictive sensors, magnetostrictive sensor 52 will generate an electrical signal proportional to the position of float 54 on rod 50 and, hence, the level of water 16 in vessel 12. The data generated from the electrical signal is then processed on boards 40 and 42 and transmitted to truck 20 for further processing. Such processing is accomplished in accordance with methods known in the art to produce, for instance, a printed record of the rate of change in the level of the electrically conductive fluid in vessel 12. Test time is approximately less than an hour.

As noted above, properly installed underground storage tanks are slightly inclined from the horizon at some predetermined angle $\theta$. Consequently, the possibility exists that at very low depth levels of water in the tank, the full length of the tank will not be wetted with water. In that instance, the difference between the volume of water which would be expected in the tank from a measurement of depth and the actual volume of water present would be larger than that accounted for by standard calculations of volume as a function of the depth of the water measured by the magnetostrictive sensor 52. An additional calculation is therefore utilized in detecting a charge in the depth of the water 16 at very low depths in the tank. So far as is known, the measurement of the tilt of the tank can be obtained only with the device described in co-pending application Ser. No. 07/833,306, also assigned to the owner of the present invention and hereby incorporated in its entirety by this specific reference thereto.

Probe 10 is employed as described above to measure water depth. However, accurate determination of the volume of water in an underground tank is critical to conformance with federal regulations limiting leakage, and similarly influx, to 0.1 gal/min. The rate of influx is determined by calculating the change in the volume of water in the tank over time, which requires that the volume of water be determinable instantaneously.

Basic trigonometric relationships show that the depth of water may be defined as a function of its length from the lower end 13 of the tank 12, along the tank bottom, as follows:

$$X = X_o + l \tan \theta$$

where as illustrated in FIG. 1, $X_o$ is the vertical distance from the tank centerline to the water level at the lower end 13 of the tank 12; 1 is the length of the water along the bottom of the tank; $\theta$ is the angle at which the tank 12 is inclined with respect to the horizon; r is the radius of the tank (assumed to be generally round in cross-section); and X is the vertical distance from the center-line of the tank to the surface of the water 16 (e.g., the interface) at any point along the length of the water.

Having defined this relationship, it may be seen that the volume of water at any time in the tank 12 may be determined by:

$$V = \int_o^L \left[ \frac{\pi r^2}{4} - \left[ \left( \frac{X_0 + l\tan\theta}{2} \right) \sqrt{r^2 - (X_o + l\tan\theta)^2} + \frac{r^2}{2} \sin^{-1}\left( \frac{x_o + l\tan\theta}{r} \right) \right] \right] dl,$$

where 1 is the length of the water along the bottom of the tank, measured form the lower end 13 of the tank. A solution of this integral will result in the volume of water in the tank 12 at any given time. The rate of influx may then be determined by calculating the rate of change in the volume of water over time, the output of magnetostrictive sensor 52 being interrogated at selected time intervals under the control of a computer (not shown) aboard truck 20. In this manner, an accurate, real-time measurement of any change in the depth of the water 16 in the tank, or vessel 16 is obtained in a much shorter period of time than with previously known methods for detecting the influx of water.

Those skilled in the art who have the benefit of this disclosure will recognize that the processing of the acquired data could be accomplished entirely by suitable electronic equipment located in truck 20. Other changes and modifications to the presently preferred embodiment illustrated and described above will be apparent to such persons, and all such changes are included within the spirit and scope of the invention as set out in the following claims.

What is claimed is:

1. An apparatus for continuously monitoring the level of water in a vessel containing hydrocarbon product, the apparatus comprising:

a magnetostrictive sensor comprised of a float slidably mounted on a rod and a means for generating an electrical signal proportional to the location of the float on the rod, the float sliding in response to the level of water in the vessel;

a cylindrical probe body having a first and a second end and a longitudinal slot therethrough, the rod of the magnetostrictive sensor extending through the slot, the slot being sealed against fluid influx when the rod extends therethrough;

a protective sleeve threadably engaged to the first end of said probe body so as to encase the float of said magnetostrictive sensor, said sleeve having openings therein to permit fluid flow therethrough;

means for processing the electrical signal generated by said magnetostrictive sensor and for transmitting the processed signal to another location for further processing; and an external housing threadably connected to the second end of said probe body opposite the first end so as to encase said processing and transmitting means and seal said processing and transmitting means against fluid influx.

2. A method for determining the rate of hydrocarbon product leakage from the volume of water entering a liquid storage vessel whose contents are under negative pressure, comprising the steps of:

determining the longitudinal angle of inclination of the vessel with respect to the horizon;

measuring the depth of the water in the vessel at predetermined time intervals with an apparatus for continuously monitoring the level of water in the vessel, the apparatus comprising:

a magnetostrictive sensor comprised of a float slidably mounted on a rod and a means for generating an electrical signal proportional to the location of the float on the rod, the float sliding in response the level of water in the vessel;

a cylindrical probe body having a first and a second end and a longitudinal slot therethrough, the rod of said magnetostrictive sensor extending through the slot, the slot being sealed against fluid influx when the rod extends therethrough;

a protective sleeve threadably engaged to the first end of said probe body so as to encase the float of said magnetostrictive sensor, said sleeve having openings therein to permit fluid flow therethrough;

means for processing the electrical signal generated by said magnetostrictive sensor and for transmitting the processed signal to another location for further processing; and an external housing threadably connected to the second end of said probe body opposite the first end so as to encase said processing and transmitting means and seal said processing and transmitting means against fluid influx;

calculating the volume of water in the vessel from each depth measurement and the angle of inclination; and ascertaining the rate of change in calculated volume of water in the vessel over time from which the rate of hydrocarbon product leakage from the vessel is determined.

* * * * *